United States Patent
Kienzle et al.

(10) Patent No.: US 11,594,799 B2
(45) Date of Patent: Feb. 28, 2023

(54) WAVEGUIDE ARRANGEMENT HAVING A WAVEGUIDE TUBE WITH AN OUTER WALL SPACED FROM AN INNER WALL OF A JACKET BY A DISTANCE LESS THAN 100 μM

(71) Applicant: VEGA Grieshaber KG, Wolfach (DE)

(72) Inventors: Klaus Kienzle, Zell am Harmersbach (DE); Fritz Lenk, Schiltach (DE); Roland Baur, Koenigsfeld (DE)

(73) Assignee: VEGA Grieshaber KG, Wolfach (DE)

( * ) Notice: Subject to any disclaimer, the term of this patent is extended or adjusted under 35 U.S.C. 154(b) by 284 days.

(21) Appl. No.: 16/748,512

(22) Filed: Jan. 21, 2020

(65) Prior Publication Data
US 2020/0235452 A1    Jul. 23, 2020

(30) Foreign Application Priority Data
Jan. 22, 2019 (EP) .................................. 19153117

(51) Int. Cl.
H01P 3/12 (2006.01)
G01F 23/284 (2006.01)
H01P 11/00 (2006.01)

(52) U.S. Cl.
CPC .............. *H01P 3/12* (2013.01); *G01F 23/284* (2013.01); *H01P 11/002* (2013.01)

(58) Field of Classification Search
CPC ......... H01P 3/12; H01P 11/002; G01F 23/284
USPC ......................................... 333/248; 73/290 R
See application file for complete search history.

(56) References Cited

U.S. PATENT DOCUMENTS

| 2,479,288 | A | * | 8/1949 | Allen | ........................ H01P 3/14 333/241 |
| 3,101,744 | A | * | 8/1963 | Warnaka | .................... H01P 3/14 333/241 |
| 7,752,911 | B2 | * | 7/2010 | Schultheiss | ........... G01F 23/284 73/290 R |
| 2007/0028829 | A1 | | 2/2007 | Griessbaum et al. | |
| 2010/0061690 | A1 | * | 3/2010 | Ko | ......................... H01P 11/002 385/134 |
| 2012/0186339 | A1 | | 7/2012 | Feisst et al. | |
| 2019/0296416 | A1 | * | 9/2019 | Hosoda et al. | ......... H01P 3/122 |

FOREIGN PATENT DOCUMENTS

| CN | 101233392 A | 7/2008 |
| DE | 198 00 306 A1 | 7/1999 |
| DE | 10 2016 124 982 A1 | 6/2018 |
| JP | 8-105784 A | 4/1996 |
| WO | WO 2007/01 7170 A1 | 2/2007 |
| WO | WO 2018/114186 A1 | 6/2018 |

OTHER PUBLICATIONS

Combined Chinese Office Action and Search Report dated Apr. 12, 2022 in Patent Application No. 202010064072.8 (with English translation of Category of Cited Documents), 9 pages.

* cited by examiner

*Primary Examiner* — Benny T Lee
(74) *Attorney, Agent, or Firm* — Oblon, McClelland, Maier & Neustadt, L.L.P.

(57) ABSTRACT

A waveguide arrangement for transmitting microwaves, and for measuring a limit level or a filling level, is provided, the waveguide arrangement for transmitting microwaves including a waveguide tube having a rectangular or elliptical inner cavity and an outer wall; and a jacket, an inner wall of which corresponds at least in sections with a shape of the outer wall of the waveguide tube.

13 Claims, 5 Drawing Sheets

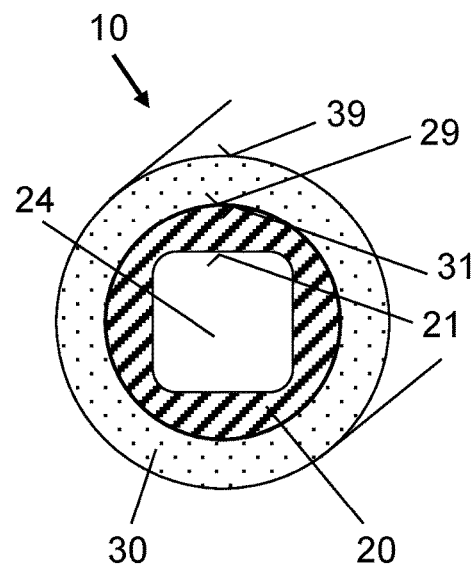
Fig. 4a
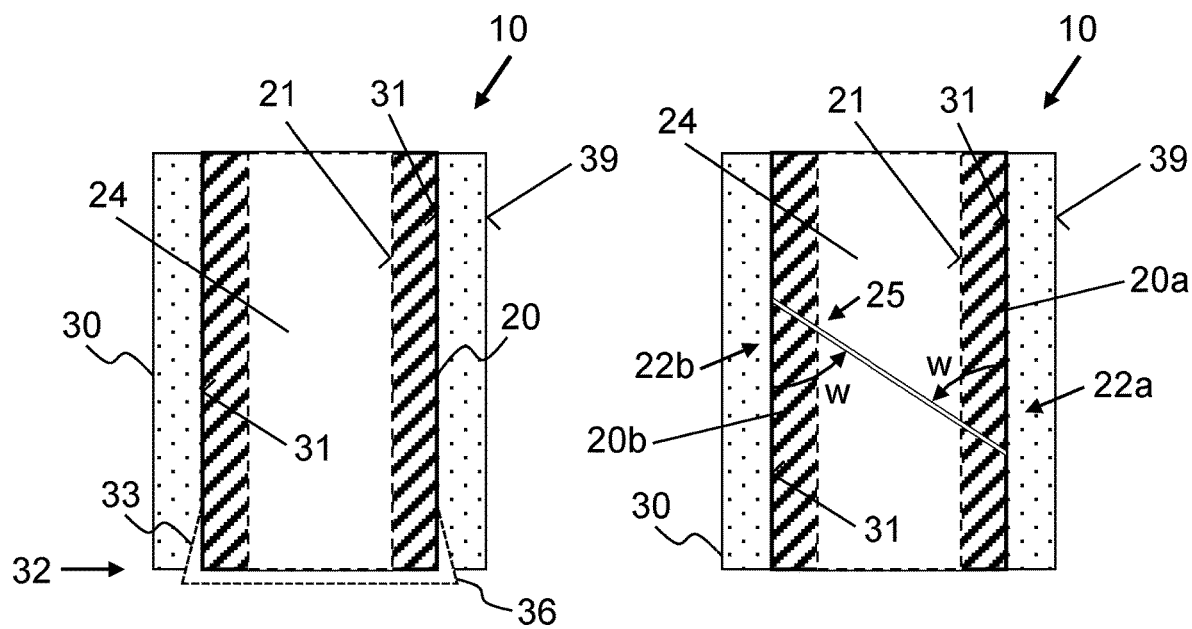
Fig. 4b  Fig. 4c

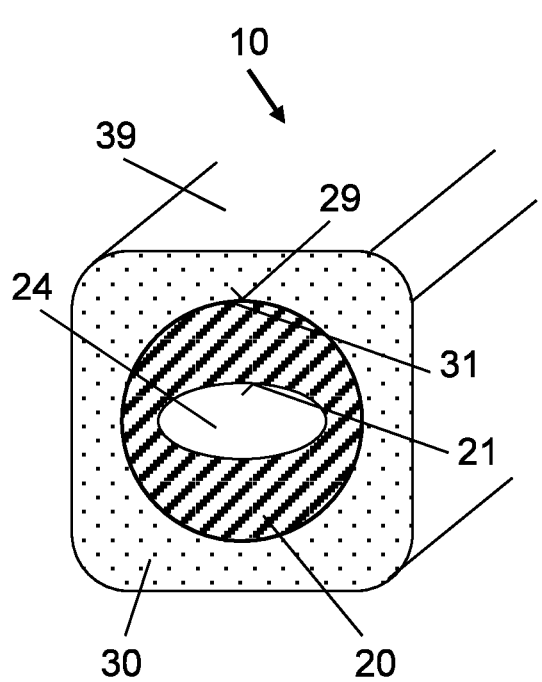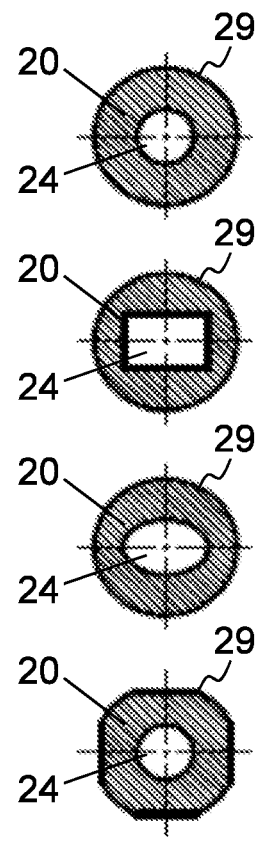
Fig. 5a
Fig. 5b
Fig. 5c
Fig. 5d
Fig. 5e
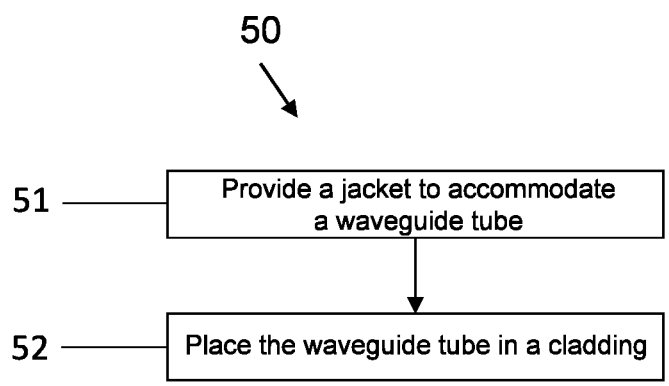
Fig. 6

WAVEGUIDE ARRANGEMENT HAVING A WAVEGUIDE TUBE WITH AN OUTER WALL SPACED FROM AN INNER WALL OF A JACKET BY A DISTANCE LESS THAN 100 µM

CROSS-REFERENCE TO RELATED APPLICATIONS

This application claims the benefit of the filing date of European Patent Application No. 19 153 117.7 filed on 22 Jan. 2019, the entire content of which is incorporated herein by reference.

TECHNICAL FIELD

The invention relates to a waveguide arrangement for transmitting microwaves, and a method of manufacturing a waveguide arrangement.

BACKGROUND

For level measurement or for limit level determination, measuring instruments are used which use a high-frequency front-end, e.g., for measuring a level by means of microwaves, especially radar waves. Waveguides may be used to transmit the microwaves from a generator to an antenna system of the measuring instrument. Because at least some of these measuring instruments are used in environments with high temperatures and/or temperature fluctuations, it may be necessary not only to provide a waveguide with high conductivity, but also to ensure high robustness against high temperatures and/or temperature fluctuations. This may allow, for example, the construction of a radar antenna system with high temperature resistance, which is coupled via the waveguide arrangement with a high-frequency generator to generate the radar signal. The electronics of the generator may be specified for a considerably narrower temperature range, so that the waveguide arrangement can be exposed to different temperatures or temperature ranges. Some of these measuring instruments use long waveguides, for instances due to this reason, whose production may be complex due to the length thereof.

SUMMARY OF THE INVENTION

A first aspect of the present disclosure relates to a waveguide arrangement for the transmission of microwaves. The waveguide arrangement comprises a waveguide tube with a rectangular or elliptical inner cavity and an outer wall. Furthermore, the waveguide arrangement comprises a jacket, the jacket may also be a cladding or sheath, the inner wall of which corresponds to the shape of the outer wall of the waveguide tube at least in sections and which accommodates the waveguide tube at least in sections.

The waveguide arrangement is designed to transmit microwaves, e.g., in a frequency range between 1 GHz and 300 GHz, for example between 30 GHz and 100 GHz. The waveguide tube is designed in such a way that the waveguide tube is adapted and/or optimized to the frequency range to be transmitted. An inner area of the waveguide tube, the inner cavity within which the microwaves are transmitted, is shaped with a high degree of accuracy, especially with regard to the smoothness of the inner wall thereof and/or the mechanical dimensions. The inner wall of some waveguide tubes may have a special treatment and/or a special tempering and/or coating. The shape of the inner wall may be rectangular or elliptical; this may also include, for example, a square or round shape. For special designs of the waveguide tube—which may result from specific optimizations and/or simulations—it may be advantageous to modify the rectangular shape, e.g., by strongly rounding off corners and/or converting the waveguide tube into a polygon. The waveguide tube may be made of a material that has a high conductivity. The material of the waveguide tube can show a high homogeneity.

The outer wall of the waveguide tube may have a similar cross-section to the inner wall of the cladding. An important criterion for the shape or cross-section of the outer wall may be that the outer wall shape or cross-section corresponds advantageously with the shape or cross-section of the inner wall of the jacket. Criteria for this may be, for example, a particularly simple, cost-effective and/or precise processing of the waveguide tube and/or the cladding. If, for example, the cladding can be manufactured particularly easily and inexpensively with a square inner cross-section, then it may be advantageous for the waveguide arrangement to use a waveguide tube with a square outer cross-section. In the waveguide arrangement, the inner wall of the cladding corresponds at least in sections with the shape of the outer wall of the waveguide tube. In this case, the jacket accommodates the waveguide tube at least in sections. In these sections, where the jacket accommodates the waveguide tube, there may be very little distance between the inner wall of the jacket and the outer wall of the waveguide tube. In some designs the spacing is less than 100 µm, in particular less than 10 µm, for example less than 1 µm. In one design, the distance is essentially zero.

Thus, a waveguide arrangement may be provided which has a high conductivity for microwaves and a high temperature stability.

In one version, the material of the jacket differs from the material of the waveguide tube. This may make it advantageously possible to select the material—and other characteristics—in an optimal way under a number of aspects. Examples of these aspects may be conductivity, cost, robustness, processability and/or others. In particular, an optimal material of the cladding may differ from an optimal material of the waveguide tube. For example, while high conductivity may be an important property of the waveguide tube, but the robustness of the waveguide tube may be less important, the requirements for the cladding may be the reverse. This may allow the waveguide assembly to be manufactured cost-effectively with optimized properties. For example, the waveguide tube may be manufactured with high precision using conventional techniques with a rectangular or elliptical inner cross-section suitable for a specified frequency and then arranged in a protective jacket using a joining technique optimised for this purpose. On the one hand, manufacturing the waveguide tube in this way may result in an excellent conductivity of the waveguide arrangement and, at the same time, a high robustness, e.g., against mechanical, chemical, and/or thermal loads. Furthermore, due to the protective jacket, it may be possible to use a thin-walled waveguide tube; this may be advantageous, e.g., regarding weight and/or cost of the waveguide arrangement.

It may be advantageous if the materials of the cladding and the waveguide tube are compatible. Compatibility may relate, for example, to the position of the materials in the so-called electrochemical voltage series, to the coefficient of thermal expansion of the materials and/or to other aspects or criteria; with regard to these criteria, the materials may be similar in order to achieve compatibility.

In one design, the outer wall of the waveguide tube has a rectangular or elliptical outer cross-section. This design can include, for example, a round or square outer cross-section. This may include rounding off the edges in the case of angular external cross-sections. Of course, the outer wall of the waveguide tube also corresponds with the inner wall of the cladding in this design.

In one design, the outer wall of the waveguide tube has a round outer cross-section. This design may be particularly advantageous if the corresponding inner wall of the jacket can be manufactured particularly accurately and/or inexpensively as a round inner wall. In this case, a round outer cross-section of the waveguide tube can facilitate fixing and positioning in the protective jacket.

In one version, the waveguide tube has an electrical conductivity of more than 20 m/Ohm mm$^2$, especially more than 50 m/Ohm mm$^2$. In this respect, the cladding has a similar coefficient of thermal expansion to that of the waveguide tube, the coefficients of thermal expansion of the cladding and the waveguide tube differing in particular by less than 3%, for example by less than 1.5%. This allows thermal stresses between the cladding and the waveguide tube to be kept low or even avoided over a wide temperature range. Mechanical problems during assembly may also be kept to a minimum.

In one design, the waveguide tube comprises materials such as copper, a copper alloy, brass, silver and/or gold, or at least one of these materials. In this case, the jacket is made of steel, stainless steel, ceramic, plastic or plastic with carbon fibre or consists of at least one of these materials. Different combinations of these materials may be advantageous. For example, a combination of stainless steel as the material of the jacket and copper as the material of the waveguide tube may be advantageous because copper has very good electrical conductivity with a thermal expansion coefficient of $16.5 \times 10^{-6}$/K, and the thermal expansion coefficient of stainless steel is $16.0 \times 10^{-6}$/K.

In one version, the inner wall of the waveguide tube is coated with brass and/or a material with a high electrical conductivity or is made of polished brass and/or a polished material with a high electrical conductivity. This may help to further improve the conductivity of the waveguide array.

In one version, the inside of the jacket and/or the outside wall of the waveguide tube is coated and/or tempered. The coating may include a plastic, a paint and/or lubricant such as graphite and/or oil. The tempering may include anodizing, burnishing, etc. The coating or tempering may contribute to a further reduction of the thermal stress between the cladding and the waveguide tube.

In a design form, the inside of the jacket has a widening, in particular a conical widening, in the area of one end of the jacket, which is designed to press in and fix the waveguide tube during assembly of the waveguide assembly. The cylindrical or conical expansion of a rectangular waveguide tube may be wedge-shaped. This design may facilitate the assembly of the hollow conductor arrangement.

In one design, the waveguide tube is fixed in the cladding by means of a conical ring. The ring may be especially slotted. The ring may be used as a mounting element with an annular inner bore or locating bore and a conical outer ring shape to accommodate the waveguide tube. The mounting element or ring is designed to engage in the conical expansion on the inside of the jacket and thus press the waveguide tube to be fixed into the jacket.

Another aspect of the present disclosure relates to a method of manufacturing an arrangement as described above or below, comprising the steps of:

Providing a jacket or cladding with an inner wall to accommodate a waveguide tube. The providing of the jacket or cladding may include, for example, seamless production of the waveguide tube, drilling, milling, other machining, coating and/or tempering. It may also be possible to machine the jacket so precisely only in the area of the ends that the jacket is suitable for inserting the waveguide tube. This may keep the processing particularly cost-effective.

Placing the waveguide tube in the cladding by one of the following methods: gluing, pressing, shrinking, soldering, welding, clamping and/or screwing.

Using the above-described methods fixes the waveguide tube in the jacket. In the waveguide arrangement, the inner wall of the cladding corresponds at least in sections with the shape of the outer wall of the waveguide tube. In this case, the jacket accommodates the waveguide tube at least in sections. In these sections, a distance between the inner wall of the cladding and the outer wall of the waveguide tube is very small.

In an embodiment, the method comprises a further step: arranging of a conical, especially slotted, ring between the jacket and the waveguide tube. This ring fixes the jacket and the waveguide tube in a simple and effective way. The ring can be designed as a self-locking retaining ring.

The ring may then be sealed on the outside, e.g., with a plastic material, so that the area between the jacket and the waveguide tube is hermetically sealed. This seal may further improve the corrosion resistance of the waveguide arrangement.

In an embodiment, the method also includes the following steps:

Cutting an end of a first waveguide tube and an end of a second waveguide tube at a predefined acute angle, wherein the end of the first waveguide tube and the end of the second waveguide tube have the same angle;

Joining the end of the first waveguide tube and the end of the second waveguide tube at a Z-angle, the first waveguide tube and the second waveguide tube being placed in the jacket.

To extend the waveguide arrangement, it may be necessary to use more than one waveguide tube. However, the transition between two waveguide tubes is, in many cases, not completely smooth and can therefore be a source of interference for the microwaves. Experiments show, however, that the interference caused by the insufficient smoothness may be significantly reduced if the waveguide tubes are not cut off at a 90° angle, but at an acute angle and thus joined together. The acute angle can be between 30° and 60°, for example about 50°.

Another aspect of the present disclosure relates to a measuring instrument for level measurement or for determining the limit level. The measuring instrument comprises:

a generator configured to generate high-frequency measurement signals in the microwave range, an antenna system arranged to radiate the high-frequency measurement signals, and a waveguide arrangement as described above and/or below, arranged to transmit the measurement signals from the generator to the antenna system.

The measuring instrument comprises an electronic system which includes a generator for generating high-frequency measurement signals or microwaves. The antenna system emits the measuring signals in direction of a medium or level and receives the reflected signals. The antenna system may comprise a fastening element for mounting, e.g., on a vessel, and a radiating element or an emitting/receiving element that emits and receives the measuring signals. The received measuring signals may be evaluated, e.g., by the electronics and determine and/or indicate a level and/or a limit level of the medium. The fixing element for mounting and the radiating element may be tightly connected and made of chemically resistant material. In order to achieve sufficient signal transmission to and from the antenna, the electronics and antenna system may be located close to each other. The electronics may be more temperature sensitive than the antenna system. For example, the electronics may be specified with a maximum temperature of, e.g., 100° C., 80° C., or 70° C. The antenna system may be made of materials designed for higher temperatures. Therefore, electronics and antenna system can be spatially separated and can be connected by means of the waveguide array. This requires a corresponding thermal design of the waveguide arrangement, which is achieved by the waveguide arrangement described.

Another aspect of the present disclosure relates to the use of a waveguide array as described above or below or a method as described above or below for transmitting microwaves to measure a level or a filling level.

For further clarification, aspects of the present disclosure are described by means of embodiments depicted in the figures, where the same components are denoted by the same reference signs throughout the figures. These embodiments are to be understood only as examples, not as restrictions.

BRIEF DESCRIPTION OF THE DRAWINGS

FIGS. 2b and 2c show details of FIG. 2a;

FIGS. 3b and 3c show details of FIG. 3a.

FIG. 4a shows a schematic sketch of a cross-section of a waveguide arrangement according to another embodiment in perspective view.

FIG. 4b shows a schematic sketch of a waveguide arrangement according to another embodiment in longitudinal section.

FIG. 4c shows a schematic sketch of a waveguide arrangement according to another embodiment in longitudinal section.

FIG. 5a shows a schematic sketch of a waveguide arrangement according to another embodiment.

FIGS. 5b, 5c, 5d, and 5e show schematic sketches of a waveguide tube according to further embodiment.

FIG. 6 shows a flow-chart of a method according to an embodiment.

DETAILED DESCRIPTION OF THE EMBODIMENTS

Figure 1:
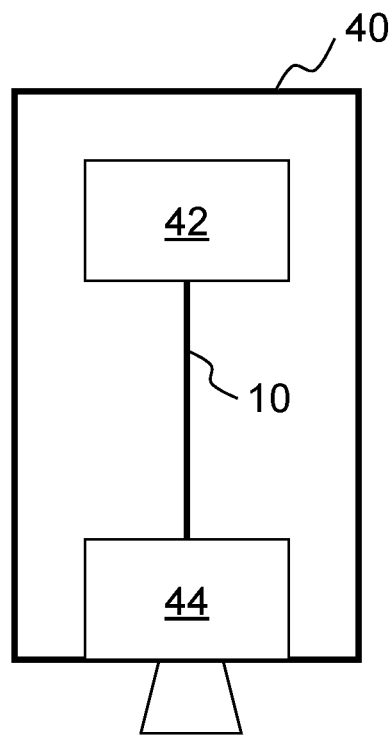
FIG. 1 shows a schematic sketch of a measuring instrument according to an embodiment.
Figure 1:
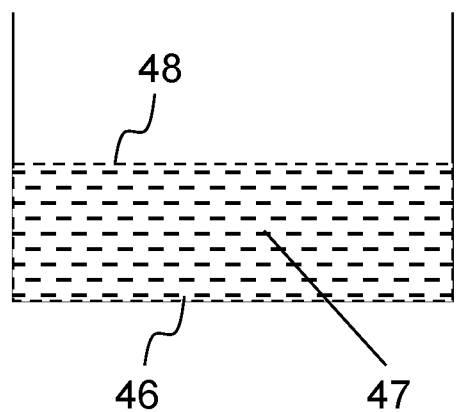

FIG. 1 shows a schematic sketch of a measuring instrument 40 for level measurement or for limit level determination according to an embodiment. The measuring instrument 40 has an electronic system,. which includes a generator 42. Generator 42 is set up to generate high-frequency measurement signals in the microwave range. Generator 42 generates high-frequency measurement signals, especially microwaves, e.g., in a frequency range between 1 GHz and 300 GHz, for example between 30 GHz and 100 GHz. The measuring instrument 40 also has an antenna system 44, which is set up to emit the high-frequency measurement signals and to receive reflected measurement signals. The generator 42 and the antenna system 44 are connected by a waveguide array 10. The connection is bidirectional. The antenna system 44 is arranged in this version above a vessel 46, which is partly filled with a product 47. The antenna system 44 is configured to determine a level and/or a limit level of a product surface 48 by means of the measuring signals generated by the generator 42. The determining may be done by generating 42 high-frequency measurement signals from the generator, transmitting them via the waveguide array 10 to the antenna system 44 and radiating them by means of the antenna system 44. The measuring signals are reflected by product surface 48, received by the antenna system 44 and transmitted via the waveguide system 10 to the electronics. The electronics then evaluates the reflected measuring signals.

Figure 2A:
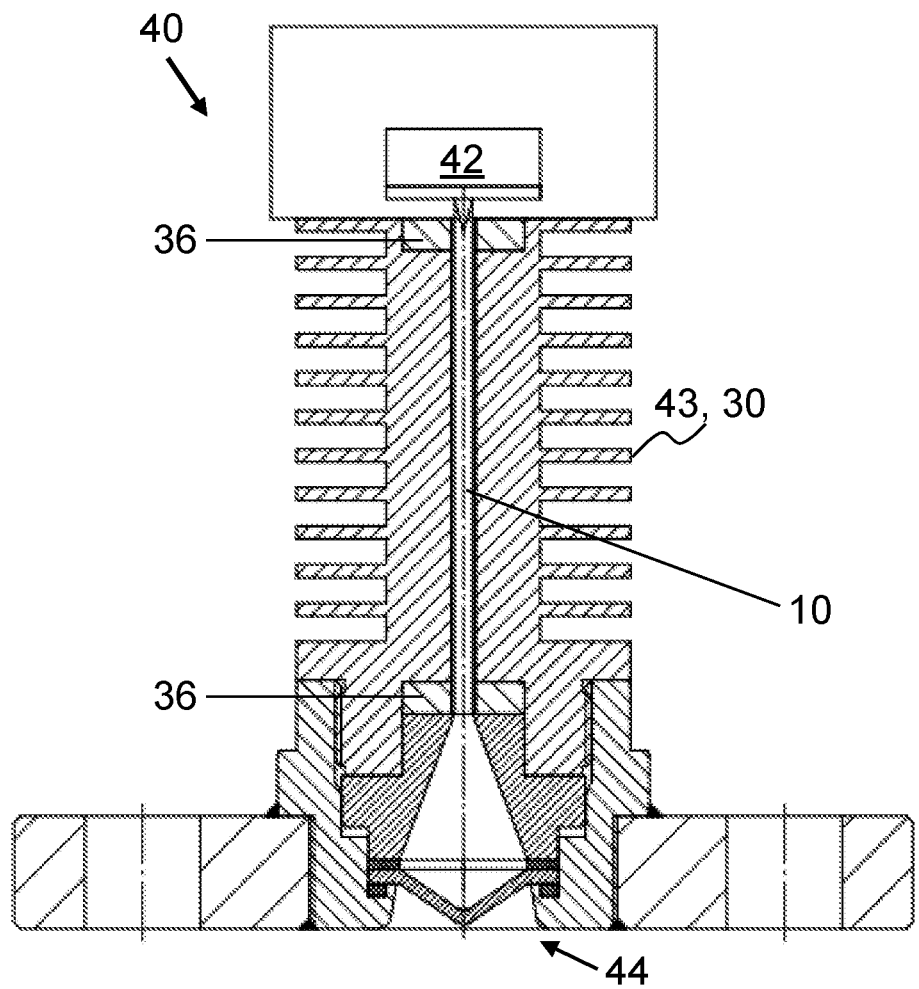
FIG. 2a shows a schematic sketch of a measuring instrument according to another embodiment.

FIG. 2a shows a schematic sketch of a measuring instrument 40 according to another embodiment. The functionality is the same as described in FIG. 1. Also in this embodiment example, an antenna system 44 is arranged in a lower area of the measuring instrument 40. The antenna system 44 is connected to a generator 42 by means of a waveguide arrangement 10 with an electronic unit. The waveguide assembly 10 has a fastening element 36 in the form of a conical ring at both ends. The waveguide arrangement 10 is surrounded by a temperature decoupling 43. The temperature decoupling 43 may be connected to a jacket 30 of the waveguide assembly 10 or, at least partially, form the jacket 30. The temperature decoupling 43 may have cooling fins as shown. The temperature decoupling 43 thermally separates the antenna system 44, which is designed for a higher temperature than the electronics, from the electronics with the generator 42.

Figure 2B:
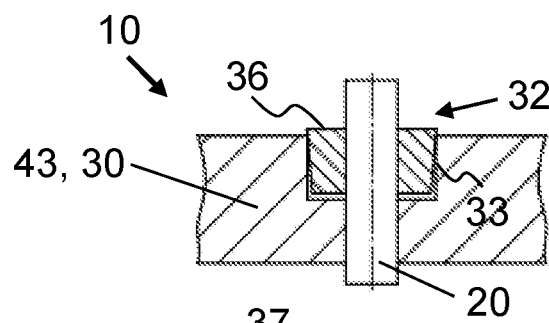

FIG. 2b shows, as a detail of FIG. 2a, the conical ring 36, which—in this embodiment—is arranged as a fastening element between the temperature decoupling 43 (which also functions as a jacket 30) and the waveguide tube 20 of the waveguide arrangement 10. It is clear from this embodiment how an end area 32 of the jacket 30 is clamped to the waveguide tube 20 and thus fixes the waveguide tube 20.

Figure 2C:
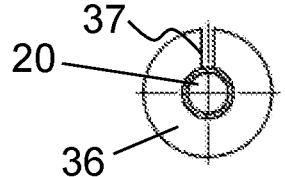

FIG. 2c shows another detail of FIG. 2a, namely a top view of the conical ring 36, which is arranged around the waveguide tube 20. In particular, the position of a slot 37 in ring 36 can be seen.

Figure 3A:
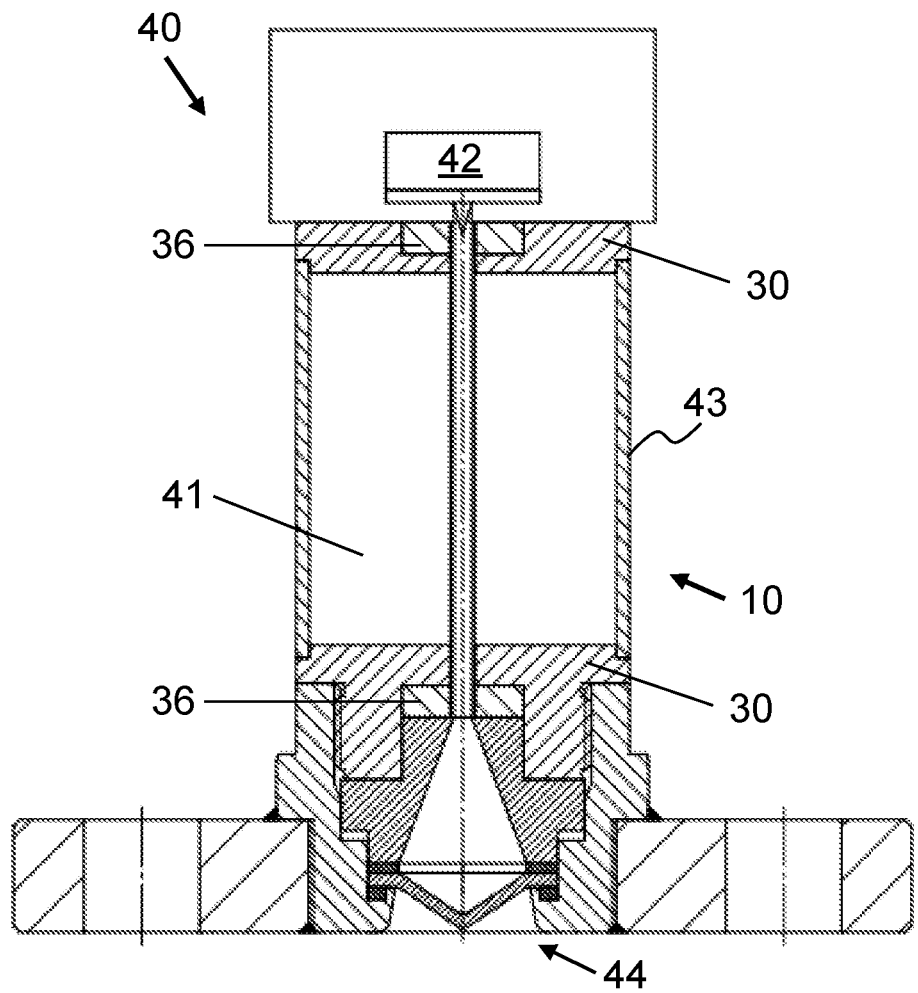
FIG. 3a shows a schematic sketch of a measuring instrument according to another embodiment.

FIG. 3a shows a schematic sketch of a measuring instrument 40 according to another embodiment. Again, the functionality is the same as described in FIG. 1. An antenna system 44 is arranged in a lower part of the measuring instrument 40. The antenna system 44 is connected to a generator 42 by means of a waveguide arrangement 10 with an electronic unit. The waveguide arrangement 10 is surrounded by a temperature decoupling 43. The temperature decoupling 43 may be spaced from the waveguide arrangement 10 as shown, e.g., by means of a cavity 41, which can be filled with air and/or another fluid, e.g., a shielding gas or transformer oil. The temperature decoupling 43 and the cavity 41 thermally separate the antenna system 44 from the electronics with the generator 42.

Figure 3B:
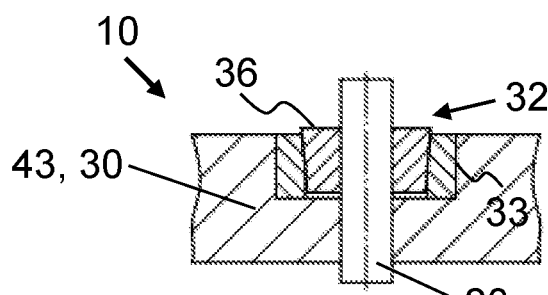

FIG. 3b shows, as a detail of FIG. 3a, another example of the conical ring 36, which is arranged between the jacket 30 and the waveguide tube 20 of the waveguide arrangement 10. The waveguide tube 20 is arranged in sections in the jacket 30.

FIG. 3b depicts how an end area 32 of the jacket 30 is clamped to the waveguide tube 20 by means of a ring 36, thus fixing the waveguide tube 20. This ring 36 is clamped in another ring-like structure; the ring-like structure is part of the mantle 30.

Figure 3C:
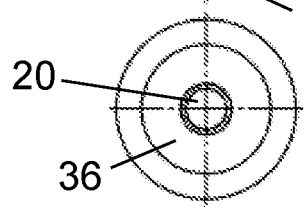

FIG. 3c shows another detail of FIG. 3a, namely a top view of the design example of the conical ring 36 of FIG. 3b, which is arranged around the waveguide tube 20. This ring 36 has no slit. This ring 36 is clamped in another ring-like structure; the ring-like structure is part of the jacket 30.

FIG. 4a shows a schematic sketch of a cross-section of a waveguide arrangement 10 according to another embodiment in perspective view. A waveguide tube 20 is surrounded by a jacket 30. The waveguide tube 20 has a rounded rectangular inner cavity 24 with an inner wall 21. The inner wall 21 of the waveguide tube 20 can be specially machined, e.g., particularly smooth, tempered and/or brass coated. An outer wall 29 of the waveguide tube 20 corresponds at least in sections with the shape of an inner wall 31 of the cladding 30. In this example, the outer wall 29 of the waveguide tube 20 has a round outer cross-section, and therefore the inner wall 31 of the cladding 30 has a round inner cross-section. A distance between the inner wall 31 of the jacket 30 and the outer wall 29 of the hollow conductor tube 20 may be less than 100 µm, in particular less than 10 µm. The material of the cladding 30 differs from the material of the waveguide tube 20, which may also lead to different properties of the cladding 30 and the waveguide tube 20. For example, the waveguide tube 20 may have a high electrical conductivity, but the protective jacket 30 may have a low electrical conductivity, at least in comparison with the conductivity of the waveguide tube 20; however, other properties of the jacket 30 and the waveguide tube 20 may be similar. For example, the jacket 30 may have a similar coefficient of thermal expansion as the waveguide tube 20. For example, the waveguide tube 20 may be made of or contain copper, and the jacket 30 may be made of or contain stainless steel. An outer wall 39 of the jacket 30 has a round shape. However, the outer wall 39 may also have a different shape, in particular a different shape from the inner wall 31 of the jacket 30.

FIG. 4b shows a schematic presentation of a waveguide arrangement 10 according to an embodiment, in a longitudinal sectional view. The same reference signs as in FIG. 4a indicate the same components. This example has an additional conical expansion 33 in an end area 32 of the jacket 30, into which a fastening element in the form of a conical ring 36 is inserted to fix the waveguide tube 20 in the jacket 30.

FIG. 4c shows a schematic sketch of a waveguide arrangement 10 according to an embodiment, in a longitudinal sectional view. The same reference signs as in FIG. 4a indicate the same components. In this example, a joint 25 is shown where an end 22a of a first waveguide tube 20a is joined to an end 22b of a second waveguide tube 20b. It is clearly visible that the ends 22a and 22b were cut off at an acute angle w. The angles w of the ends 22a and 22b are equal. The ends 22a and 22b are then joined together at a Z-angle. The use of an acute angle w for the Z-angle may advantageously result in a lower microwave interference at joint 25 than with a straight cut (w=90°.

FIG. 5a shows a schematic sketch of a waveguide arrangement 10 according to another embodiment. The same reference signs as in FIG. 4a indicate the same components. This design differs from the design of FIG. 4a in the shape of the outer wall 39 of the jacket 30 and in the shape of the inner cavity 24 or the inner wall 21 of the waveguide tube 20. In this design example, the outer wall 39 of the jacket 30 is rectangular with rounded edges. The inner wall 21 of the waveguide tube 20 has an elliptical shape.

FIGS. 5b,5c, 5d, and 5e show schematic sketches of a waveguide tube 20 according to other embodiments. FIG. 5b has a round inner cavity 24 and a round outer wall 29. FIG. 5c has a rectangular inner cavity 24 and a round outer wall 29. FIG. 5d has an elliptical inner cavity 24 and a round outer wall 29 and corresponds approximately to the waveguide tube 20 of FIG. 5a. FIG. 5e has a round inner cavity 24 and has a polygonal outer wall 29 as a departure from a rectangular outer wall.

FIG. 6 shows a flowchart 50 of a process according to an embodiment. A jacket 30 is provided in step 51. The jacket 30 has an inner wall 31 to accommodate a waveguide tube 20. The provision of the jacket may include, for example, seamless production, drilling, milling, other machining, coating, and/or tempering. It may also be possible to machine the jacket only at the ends so precisely that the jacket is suitable for inserting the waveguide tube. In a step 52 the waveguide tube 20 is placed in the cladding 30. The arrangement of the waveguide tube 20 in the jacket 30 may be carried out, e.g., by gluing, pressing, shrinking, soldering, welding, clamping and/or other methods.

In addition, it should be noted that "comprising" and "having" does not exclude other elements or steps and the indefinite articles "an" or "a" do not exclude a plurality. It should also be noted that features or steps described with reference to one of the above embodiments may also be used in combination with other features or steps of other embodiments described above. Reference signs in the claims are not to be considered as limitations.

LIST OF REFERENCE SIGNS

10 Waveguide arrangement
20 Hollow conductor tube
20a, 20b first or second waveguide tube
21 Inner wall of the waveguide tube
22a, 22b first or second end of the waveguide tube
24 Inner cavity of the waveguide tube
25 Joint of the waveguide tube
29 Outer wall of the waveguide tube
30 Jacket, coating or sheath
31 Inner wall of the jacket
32 Shell end section
33 Expansion
36 Ring, fastening element
37 Slot
39 Outer wall of the jacket
40 Measuring device
41 Cavity
42 Generator (with electronics)
43 Temperature decoupling
44 Antenna system
46 Container
47 Filling material
48 Filling material surface
50 Flow chart
51, 52 Step

The invention claimed is:
1. A waveguide arrangement for transmitting microwaves, comprising:
   a waveguide tube having a rectangular or elliptical inner cavity, and an outer wall; and
   a jacket, an inner wall of the jacket corresponding at least in sections with a shape of the outer wall of the waveguide tube and being configured to receive the waveguide tube at least in sections, wherein a distance between the inner wall of the jacket and the outer wall of the waveguide tube is less than 100 μm.

2. The waveguide arrangement according to claim 1, wherein a material of the jacket is different from a material of the waveguide tube.

3. A measuring instrument for level measurement or for limit level determination, comprising:
 a generator configured to generate high-frequency measurement signals in a microwave range;
 an antenna system configured to radiate the generated high-frequency measurement signals; and
 the waveguide arrangement according to claim 1, configured to transmit the generated high-frequency measurement signals from the generator to the antenna system.

4. The waveguide arrangement according to claim 1, wherein the inner wall of the waveguide tube has a rectangular or elliptical outer cross-section.

5. The waveguide arrangement according to claim 1, wherein the outer wall of the waveguide tube has a round outer cross-section.

6. The waveguide arrangement according to claim 1, wherein the waveguide tube has an electrical conductivity of greater than 20 m/Ohm mm², and
 a coefficient of thermal expansion of the jacket and a coefficient of thermal expansion of the waveguide tube differ by less than 3%.

7. The waveguide arrangement according to claim 1, wherein the waveguide tube comprises copper, a copper alloy, brass, silver, and/or gold, or at least one of these materials, and/or
 wherein the jacket comprises steel, stainless steel, ceramic, plastic, or plastic with carbon fibre, or at least one of these materials.

8. The waveguide arrangement according to claim 1, wherein an inner wall of the waveguide tube is coated with brass and/or a material having a high electrical conductivity, and/or
 wherein the inner wall of the jacket and/or the outer wall of the waveguide tube is coated and/or tempered.

9. The waveguide arrangement according to claim 1, wherein the inner wall of the jacket has a widening in a region of one end of the jacket, which is configured for pressing in and fixing the waveguide tube during assembly of the waveguide arrangement.

10. The waveguide arrangement according to claim 9, wherein the waveguide tube is fixed in the jacket by a conical ring.

11. A method of manufacturing a waveguide arrangement according to claim 1, the method comprising the steps of:
 providing the jacket having an inner wall configured to receive the waveguide tube; and
 placing the waveguide tube in the jacket by one of gluing, pressing, shrinking, soldering, welding, clamping, and/or screwing.

12. The method according to claim 11, further comprising the step of:
 arranging a conical ring between the jacket and the waveguide tube.

13. The method according to claim 11, further comprising the steps of:
 cutting an end of a first waveguide tube and an end of a second waveguide tube at a predefined acute angle, the end of the first waveguide tube and the end of the second waveguide tube having a same predefined acute angle; and
 joining the end of the first waveguide tube and the end of the second waveguide tube at a Z-angle,
 wherein the first waveguide tube and the second waveguide tube are arranged in the jacket.

* * * * *